United States Patent [19]

Köhler et al.

[11] Patent Number: 4,723,456

[45] Date of Patent: Feb. 9, 1988

[54] ARM-WINDOW LIFTER, ESPECIALLY FOR MOTOR VEHICLES

[75] Inventors: Dieter Köhler, Untermerzbach; Klaus Blau, Coburg, both of Fed. Rep. of Germany

[73] Assignee: Brosefahrzeugteile GmbH & Co., KG, Coburg, Fed. Rep. of Germany

[21] Appl. No.: 892,816

[22] Filed: Aug. 4, 1986

[30] Foreign Application Priority Data

Aug. 2, 1985 [DE] Fed. Rep. of Germany ....... 3527876
Mar. 4, 1986 [DE] Fed. Rep. of Germany ....... 3607078

[51] Int. Cl.⁴ ........................ E05F 11/44; F16H 21/16

[52] U.S. Cl. ........................ 74/89.18; 49/351; 74/98

[58] Field of Search ........................ 74/89.18, 89.19, 98, 74/52, 803; 49/348, 349, 350, 351

[56] References Cited

U.S. PATENT DOCUMENTS

| | | | |
|---|---|---|---|
| 1,818,642 | 8/1931 | Nicholson | 74/89.19 |
| 2,409,068 | 10/1946 | Roethel | 74/89.19 |
| 2,410,363 | 10/1946 | Roethel | 74/89.19 |
| 2,452,448 | 10/1948 | Floraday | 74/89.19 |
| 2,684,847 | 7/1954 | Barden | 74/89.19 |

FOREIGN PATENT DOCUMENTS

| | | |
|---|---|---|
| 689235 | 3/1940 | Fed. Rep. of Germany . |
| K16025V | 8/1956 | Fed. Rep. of Germany . |
| 2317551 | 10/1973 | Fed. Rep. of Germany . |
| 2715447 | 11/1977 | Fed. Rep. of Germany . |

OTHER PUBLICATIONS

Strength of material reference titled "Modulreihe fur Stirnrader, Tabelle 1", dtd May, 1977.

*Primary Examiner*—Allan D. Herrmann
*Attorney, Agent, or Firm*—Barnes & Thornburg

[57] ABSTRACT

An arm-window lifter, especially for motor vehicles, with a main arm engaging at a window which is supported at a support member by way of a first pivot bearing and pivotal manually and/or motor driven, and with a positively controlled auxiliary arm engaging at the window and rotatably supported on the main arm, which includes a planetary gear element which is supported at the main arm at an axial distance to the first pivot bearing in a second pivot bearing, whereby the planetary gear element engages at the auxiliary arm and in teeth fixedly arranged at the support member.

30 Claims, 9 Drawing Figures

ARM-WINDOW LIFTER, ESPECIALLY FOR MOTOR VEHICLES

The present invention relates to an arm-window lifter, especially for motor vehicles, and more particularly to an arm-window lifter with a main arm that is supported at a support member by way of a first pivot bearing, can be pivoted by means of a drive device and engages at a windowpane, and with a positively controlled auxiliary arm rotatably supported at the main arm and engaging the windowpane.

In prior art arm-window lifters of this type, the main and auxiliary arm form a lever arm cross, whereby the universal joint is arranged on the main arm approximately in the center between the first pivot bearing and the point of force engagement of the main arm at the windowpane and on the auxiliary arm approximately in the center between the point of force engagement of the auxiliary arm at the windowpane and a point of force engagement at an auxiliary rail fixed with the support member. During a pivot movement of the main arm, the auxiliary arm is taken along correspondingly, whereby the guidance of the corresponding auxiliary arm end in the auxiliary rail assures the positive control of the auxiliary arm (by way of a guide roller, a slide member or the like). With the indicated position of the cross arm joint and with corresponding orientation of the auxiliary rail, there results a parallel movement of the window which is desired in most of the cases, i.e., a purely translatory movement of the windowpane without pivot movement in the plane of the windowpane, in other words, the lower windowpane edge, respectively, a lever rail surrounding the window edge and vertically displaced by the two arms is displaced parallelly during a window lifter actuation. However, a pivot movement of the windowpane during the vertical movement can also be achieved by a corresponding change of the geometric conditions.

It is disadvantageous with this prior art arrangement, on the one hand, that the auxiliary rail requires additional installation space and, as separate component, has to be separately installed and adjusted, or that with a one-piece construction and with a base plate carrying the first pivot bearing and forming the support member, the base plate is greatly enlarged. On the other hand, the torque transmitted from the main arm to the auxiliary arm is dependent on the instantaneous angular position between auxiliary arm and auxiliary rail and is therefore nonuniform over the entire travel.

The present invention is concerned with the task to provide an arm-window lifter of the aforementioned type having a compact construction and uniform torque curve.

The underlying problems are solved according to the present invention in that a planetary gear element is supported on the main arm in a second pivot bearing at an axial distance to the first pivot bearing and in that the planetary gear element engages at the auxiliary arm as well as in a toothed arrangement fixed at the support member. The second pivot bearing can be displaced from the longitudinal center of the first arm in the direction toward the first pivot bearing or even therebeyond; correspondingly, also the radius of the planetary gear can be selected relatively small so that the teeth fixed at the support member find ample space on the base plate which at most is only slightly enlarged. With a constant torque of the main arm during the travel, the torque transmitted to the auxiliary arm is also essentially constant during the travel.

According to a particularly preferred embodiment which is characterized by a simple construction and reliable operation, the auxiliary arm is nonrotatably connected with the preferably sector-shaped planetary gear element and the teeth fixed at the support member are formed by internal teeth of a toothed arc. As the auxiliary arm, as a rule, does not have to carry out a complete rotation during the travel, the planetary gear element can be constructed correspondingly sector-shaped which reduces the manufacturing expenditures as well as the weight of the window lifter. The use of a hollow gear-like toothed arc offers the advantage, on the one hand, that the tooth flank loads are reduced, in comparison, for example, with a central sun gear, which permits the use of less mechanically stable but more cost-favorable materials; on the other hand, the desired oppositely directed movement of main arm and auxiliary arm which is desired with most of the arm window lifters can be achieved without difficulties.

According to another feature of the present invention the distance between the axis of the second pivot bearing and the point of force engagement of the main arm at the window is essentially equal to the distance between the axis of the second pivot bearing and the point of force engagement of the auxiliary arm at the window, and the distance between the axes of the two pivot bearings corresponds essentially to the effective radius of the planetary gear element. These features are effective to obtain a parallel movement of the window. On the other hand, a pivot movement of the window can be achieved without difficulty in that at least one of these distances is selected different from those indicated hereinabove.

According to a preferred embodiment of the main arm, the latter is formed by a toothed-segmental arc portion carrying the first pivot bearing and constructed with a toothed-segmental arc and by an arm portion fixedly attached at the toothed-segmental arc portion on the side of the first pivot bearing opposite the toothed-segmental arc.

In order to be able to construct the bearing support of the auxiliary arm and of the planetary gear element at the main arm in a particularly simple manner with an at least approximately parallel movement of the window, namely, in such a manner that the planetary gear element is arranged on the inside of the main arm facing the support member and the auxiliary arm on the outside of the main arm with nonrotatable connection of the auxiliary arm and planetary gear element by a bearing bolt extending through the main arm, the main arm, according to still a further feature of the present invention, is provided within the area of the first pivot bearing with a slot through which the planetary gear element can extend. This slot permits that the planetary gear element can penetrate into an area above the first pivot bearing.

According to another feature of the present invention, the formation of the slot is taken over by the toothed-segmental arc portion whereby the plate-shaped toothed-segmental arc portion is provided with a slot arranged in the area between the two pivot bearings and partially surrounding the first pivot bearing while the section of the plate-shaped toothed-segmental arc portion carrying the second pivot bearing is retained by means of corresponding bent portions within the area of the two slot ends parallel and with an internal spacing to the plane of the plate of the remaining section of the toothed-segmental arc portion carrying the toothed-segmental arc. The arm portion can be constructed correspondingly simple, especially if the essentially strip-shaped arm portion is rigidly secured at the mounting section on the side of the second pivot bearing opposite the first pivot bearing. The strip is preferably a sheet metal strip so that a corresponding piece can then be cut off directly from the band coil corresponding to the desired main arm length.

According to a modified embodiment of the present invention, the arm portion may be rigidly secured with a fork-shaped end at the toothed-segmental arc portion whereby the fork ends surround the first pivot bearing and are each correspondingly bent off for the formation of an internal spacing between the plane of the essentially plate-shaped toothed-segmental arc portion and the movement plane of the arm portion. This permits the use of a conventional toothed-segmental arc portion because the arm portion forms the engagement slot with its fork-shaped ends.

The conditions for the parallel movement or nearly parallel movement of the window can be achieved with the distance between the axis of the first pivot bearing and the point of force engagement of the main arm as indicated hereinabove, also with different distances between the axes of the two pivot bearings if one correspondingly matches the radius of the planetary gear element as well as the auxiliary arm length. If the compactness is not of overriding consideration, the axial distance can be increased in order to achieve lower tooth stresses and loads. In order not to have to change the main arm, the arm portion may be provided with at least two bearing places for the second pivot bearing.

A preferred construction of the second pivot bearing is achieved in accordance with the present invention in that the second pivot bearing is formed by a bearing bolt which extends through a bearing bore of the main arm and whose one end is nonrotatably connected with the auxiliary arm and whose other end is nonrotatably connected with the planetary gear element. Low manufacturing costs with high rigidity of the connection can be achieved in accordance with the present invention if the bearing bolt has a cylindrical center section matched to the bearing bore and at least one noncircular end section over which is placed the respective part with a complementary opening and is rigidly connected with this end section. Both end sections may thereby have the indicated shape whereby the riveting can then take place in a single step.

According to another feature of the present invention, the bearing bolt may have an end section increased in diameter in comparison to the center section, which is welded together with the planetary gear element or with the auxiliary arm, and more particularly at the radial annular surface formed between the end section and the center section by means of welding humps. Such an arrangement assures that the toothed arc and planetary gear element remain reliably in mutual engagement. By reason of the relatively small tooth load, the selection of the material for the guide web is noncritical so that the same can be made as separate part or in one piece with the toothed arc of metal or plastic material, especially also of a corresponding molded part which reduces the manufacturing costs. If the toothed arc is formed in one piece with the guide web, an aluminum or zinc die-cast part or a synthetic resinous part can be used.

In order to be able to carry out a rapid and simple angular adjustment of the auxiliary arm in relation to the main arm with small structural expenditures, the toothed arc is secured on the support member adjustable in the direction of the toothed arc.

If at least one of the two pivot bearings is constructed as plastic material bearing, a frictionless and low-wear operation of the two pivot bearings together with low material costs is assured.

In complete departure from the hitherto customary arrangement of the second pivot bearing between the first pivot bearing and the point of force engagement of the main arm at the window, the present invention also proposes in a modified embodiment that the second pivot bearing be arranged on the main arm on the side of the first pivot bearing opposite the point of force engagement of the main arm at the window. The construction becomes particularly stable in this manner from a mechanical point of view because the main arm is not mechanically weakened by the second pivot bearing between the first pivot bearing and the point of force engagement at the window. Within this area, the main arm can be constructed correspondingly narrow. Furthermore, a still more compact construction results because the teeth fixed at the support member can be arranged within an area of the support member which is provided already for the pivot bearing support of a driving pinion for the toothed-segmental arc of the main arm.

According to still further features of the present invention, the toothed arc, which includes as internal teeth the teeth fixed at the support member, can be provided within the area of a toothed-segmental arc of the main arm while the toothed arc may at least partially extend over the front end opposite the support member of the toothed-segmental arc. This arrangement permits that a toothed arc forming the teeth fixed at the support member can be provided within the movement area of the toothed-segmental arc of the main arm, at least partly extending over the same, so that a movement of the toothed-segmental arc away from the support member by reason of increased loads and stresses is precluded already beforehand.

The arrangement of the second pivot bearing on the side of the first pivot bearing opposite the point of force engagement of the main arm at the window enables a particularly simple, mechanically sturdy construction of the main arm. For that purpose, the essentially strip-shaped arm portion includes an arm section carrying the second pivot bearing which extends from the fastening place of the arm portion at the toothed-segmental arc portion up to the end of the arm portion opposite the point of force engagement of the main arm at the window while the planetary gear element is arranged between the arm section and the toothed-segmental arc portion. If the arm section has a double-bend within the area of the fastening place, then the distance between the arm section and the toothed-segmental arc portion necessary for the planetary gear element can be obtained without difficulty. The planetary gear element can pivot without difficulty through the area of the first pivot bearing because the first pivot bearing is constructed at the toothed-segmental arc portion.

These and other objects, features and advantages of the present invention will become more apparent from the following description when taken in connection with the accompanying drawing which shows, for purposes of illustration only, several embodiments in accordance with the present invention and wherein.

Figures 1, 9:
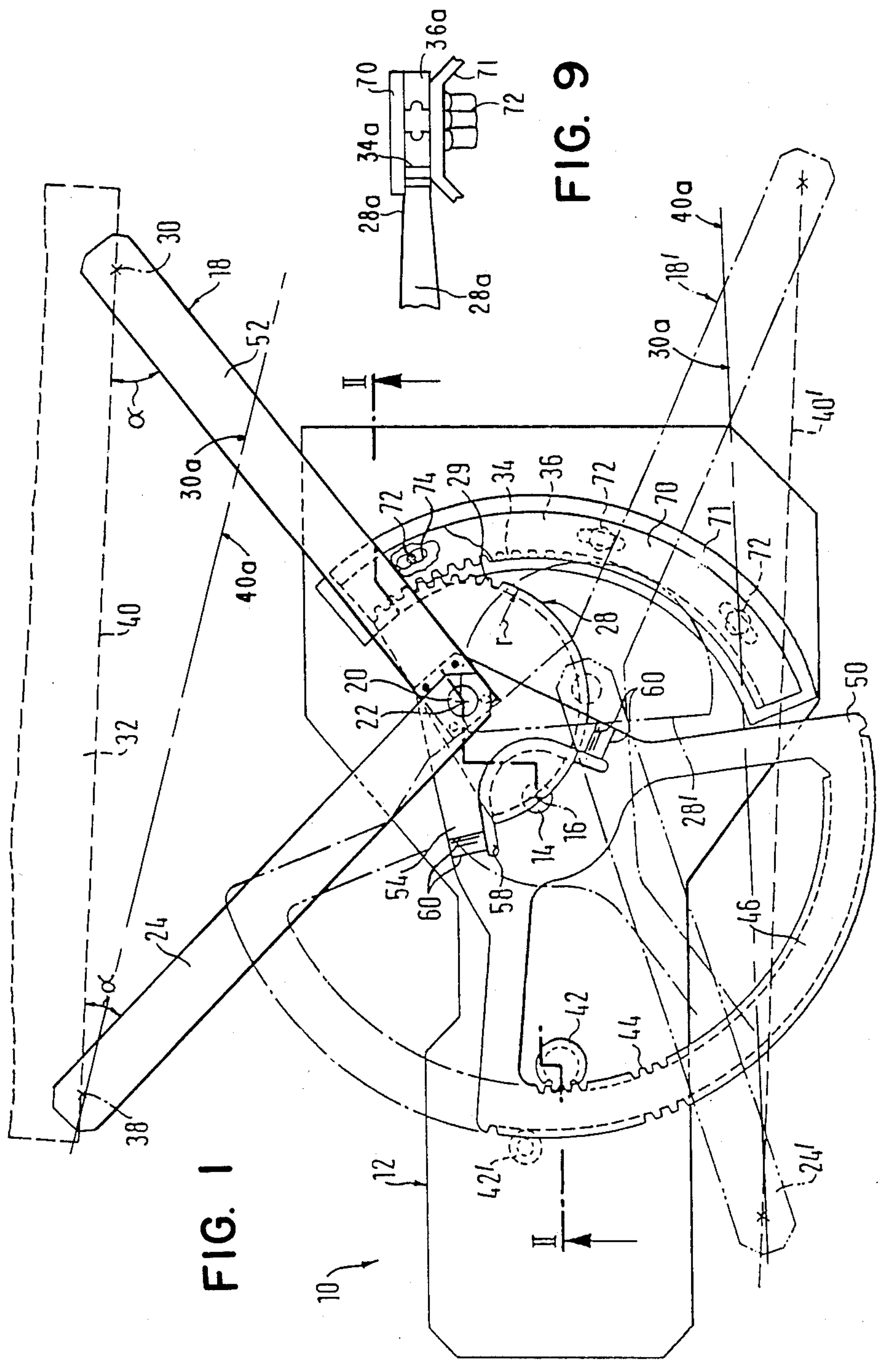
FIG. 1 is a simplified side elevational view of an arm-window lifter in accordance with the present invention.
FIG. 9 is a partial cross-sectional view showing a modified friction drive to replace the gear drive of FIG. 1.
Figures 2, 3, 4, 5, 6:
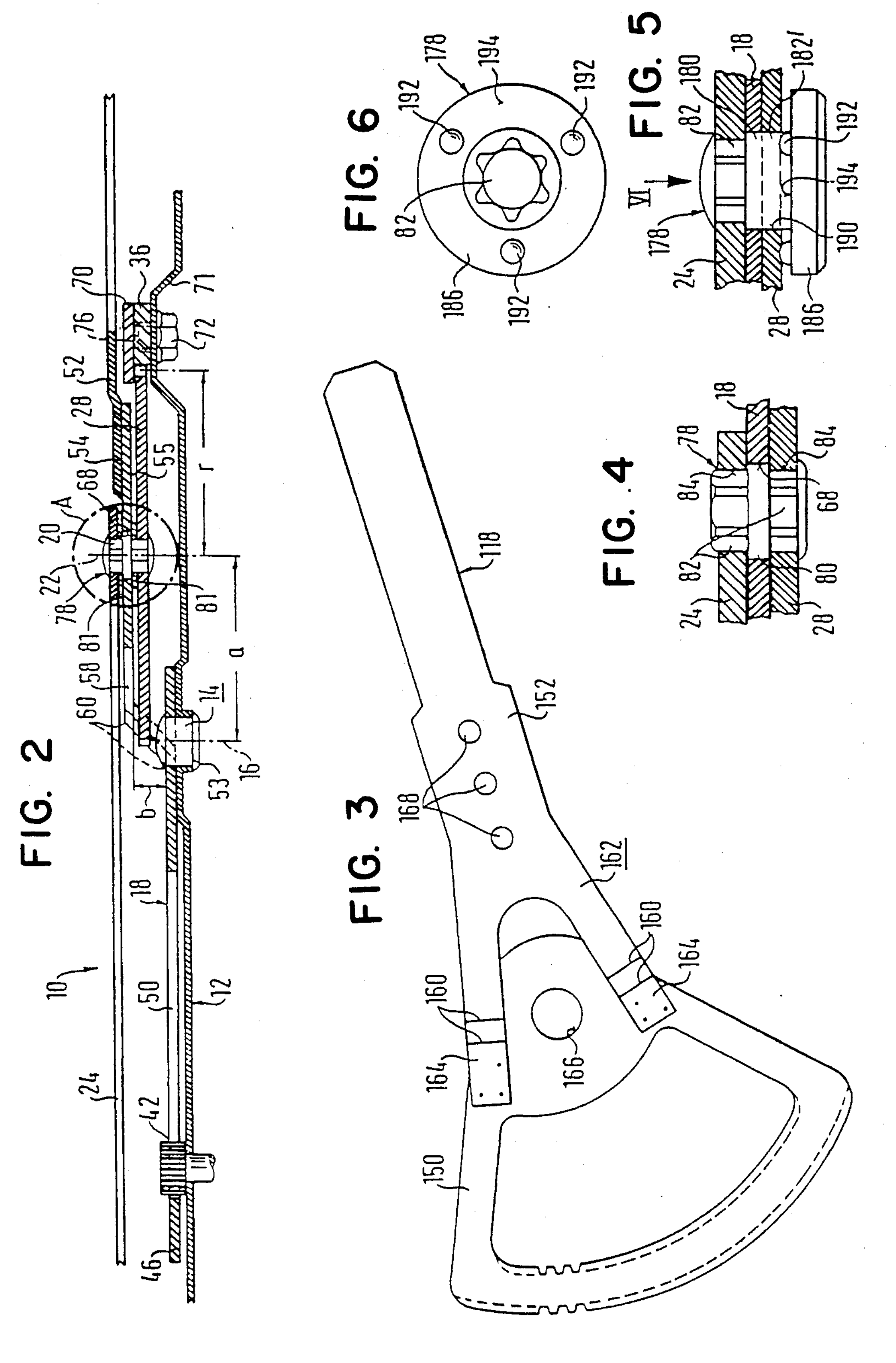
FIG. 2 is a cross-sectional view of the arrangement of FIG. 1, taken along line II—II thereof.
FIG. 3 is a side elevational view, of a modified embodiment of a main arm in accordance with the present invention.
FIG. 4 is a partial cross-sectional view through the pivot bearing of the auxiliary frame at the main frame, illustrating the detail A in FIG. 2.
FIG. 5 is a partial cross-sectional view, similar to FIG. 4, through a modified embodiment of a pivot bearing in accordance with the present invention.
FIG. 6 is a plan view on the stepped bolt of the pivot bearing of FIG. 5.

Referring now to the drawing wherein like reference numerals are used throughout the various views to designate like parts, the window lifter illustrated in simplified form in FIGS. 1 and 2 is generally designated therein by reference numeral 10. A main arm generally designated by reference numeral 18 is rotatably supported on a base plate 12 serving as support member in a first pivot bearing 14 having an axis 16. An auxiliary arm 24 as well as a planetary gear element 28 in the form of a toothed sector with external teeth 29, which is nonrotatably connected with the auxiliary arm 24, is again rotatably supported on the main arm 18 in a second pivot bearing 20 having an axis 22 parallel to the axis 16. The distance a (FIG. 2) between the axes 16 and 22 amounts to about 1/5 to 1/6 of the effective main arm length, i.e., of the distance between the axis 16 and the point of force engagement 30 at the free end of the main arm 18, by means of which the latter engages at a windowpane 32 merely schematically indicated in dash lines, especially by way of a guide roller at the point 30 which engages in a lever rail (not shown) at the lower window edge.

The planetary gear element 28 engages with its external teeth 29 in the internal teeth 34 of a toothed arc 36, whereby the effective radius of the planetary gear element is designated by reference character r in FIG. 2.

The length of the auxiliary arm 24 is so selected that the distance between the axis 22 of the second pivot bearing 20 and a point of force engagement 38 of the auxiliary arm 24 corresponding to the point 30, corresponds exactly to the distance between the axis 22 and the point of force engagement 30; furthermore, the distance a between the axes 16 and 22 is selected exactly so that the same corresponds to the effective radius r of the planetary gear element 28 (see also FIG. 2). As will be explained more fully hereinafter, these geometric conditions necessarily bring about a parallel movement of the windowpane 32, i.e., an exclusively translatory movement of the window in which the line 40 extending through the points of force engagement 30 and 38 is displaced in parallel, whereby the lower position of this line is indicated by dash line 40′ while the lower pivotal positions of the main arm 18, of the auxiliary arm 24 and of the planetary gear element 28 are indicated in FIG. 1 by dash and dotted lines 18′, 24′ and 28′.

The main arm 18 is driven by a pinion 42 which itself is driven either manually or by a motor, whereby the corresponding drive arrangement (hand crank or motor drive) is omitted in the drawing for the sake of clarity. The pinion 42 engages in internal teeth 44 of a toothed-segmental arc 46. However, depending on the spatial conditions of the drive of the toothed-segmental arc 46, also a pinion engaging in external teeth of the toothed arc 46 may be used which is indicated in FIG. 1 in dash line and carries the reference numeral 42′.

The toothed arc 46 is part of an approximately arcuate triangularly shaped toothed-segmental arc portion 50 which, together with a separate arm portion 52, forms the main arm 18. The arm portion 52 is rigidly connected according to FIGS. 1 and 2 with a mounting section 54 of the toothed-segmental arc portion 50 carrying the second pivot bearing 20, especially by spot welding. The mounting section 54 which is flat within the area of the second pivot bearing 20 is retained at an interior distance b to (FIG. 2) and in parallel with the flat area of the toothed-segmental arc 50 forming the toothed-segmental arc 46 as well as the first pivot bearing 14 whereby the distance b is selected so large that the planetary gear element 28 has sufficient space between the first pivot bearing 14 (bearing bolt 53) and the inside 55 of the mounting section 54 facing the base plate 12. The planetary gear element 28, which is in the form of a flat disk circular-sector-shaped in contour with a sector angle greater than 180°, lies in a movement plane which is disposed parallel to the movement planes of the toothed-segmental arc portion 50, the main arm 18 and the auxiliary arm 24.

The planetary gear element 28 extends into the area of the first pivot bearing 14 through an essentially U-shaped slot 58 in the toothed-segmental arc portion 50 which essentially surrounds the first pivot bearing 14. The mounting section 54 starts at the two slot ends on the slot outside by way of a double bend 60 each from the remaining section of the toothed-segmental arc portion 50 whereby the double bends 60 according to FIG. 2 assure the interior distance b.

A modification of the main arm 18 of FIGS. 1 and 2 is illustrated in FIG. 3 which is generally designated by reference numeral 118. In this embodiment a customary toothed-segmental arc portion 150 is used (flat and without a slot corresponding to the slot 58), at which a fork-shaped end 162 of the arm portion 152 is rigidly secured, especially by spot-welding. The two fork ends 164 thereby surround a circular opening 166 of the toothed-segmental arc portion 150 determining the first pivot bearing 14. Bends 160 within the area of the two fork ends 164 which correspond to the double bends 60 assure for the formation of the interior distance b between the plane of the toothed-segmental arc portion 150 and the movement plane of the arm portion 152.

Altogether three circular openings 168 in a center area of the arm portion 152 can be seen in FIG. 3 which define each a possible bearing place for the second pivot bearing 20. It is therefore possible with an unchanged main arm 118 to utilize different configurations of planetary gear elements 28 and auxiliary arm 24 with correspondingly matched toothed arc.

The toothed arc 36 in FIGS. 1 and 2 is provided with a guide web 70 covering the internal teeth 34 on the side opposite the base plate 12, which in this manner holds the planetary gear element 28 in engagement with the internal teeth 34. In order to hold the internal teeth 34 at the height of the planetary gear element 28, the toothed arc 36 is secured on a correspondingly arched portion 71 of the base plate 12. Altogether three fastening head bolts 72 can be seen in FIG. 1 which are screwed from below into threaded bores 76 of the toothed arc 36, extending through curved elongated apertures 74 in the base plate 12. The elongated apertures 74 permit an adjustment of the angular position of the auxiliary arm 24 relative to the main arm 18. By a corresponding displacement of the toothed arc 36, the planetary gear 28 rotates with the main arm 18 fixed and the auxiliary arm 24 rotates together with the planetary gear element 28. The head bolts 72 are then tightened in the desired position.

By reason of the relatively large effective radius r of the planetary gear element 28, at least three and maximum sixteen teeth, optimally six teeth of the external toothed arrangement 29, engage in the internal teeth 34 with a tooth-module 2 according to DIN-Norm 780, part 1, "Modulreihe fuer Zahnraeder, Moduln fuer Stirnraeder, Tabelle 1". By reason of the corresponding low tooth flank loads, the toothed arc 36 can be made of nonhardened material, especially as aluminum or zinc die-cast part. With a relatively large radius r, also a synthetic resinous part can be used. Furthermore, the possibility exists to construct the guide web 70 in one piece with the toothed arc 36.

The second pivot bearing 20 is formed according to FIGS. 2 and 4 by a bearing bolt generally designated by reference numeral 78. A cylindrical center section 80 of this bolt 70 is inserted into the corresponding circular opening 68 of the main arm 18 for the pivot bearing formation, whereby a plastic bushing (not shown) at the outer circumference of the center section 80 may assure for a wear-free, easy-operating bearing support. Plastic ring-type washers 81 (FIG. 2) may be inserted between the auxiliary arm 24 and the main arm 18, respectively, between the main arm 18 and the planetary gear element 28 which serve the same purpose.

The bolt 78 is provided on both sides of the center section 80 with a nonround end section 82 for the nonrotatable connection of the auxiliary arm 24 and of the planetary gear element 28, especially having a TORX-shape whose contour can be seen in FIG. 6.

The auxiliary arm 24 as well as the planetary gear element 28 with complementarily constructed apertures 84 are then placed over these two ends sections 82. Subsequently, the bolt 78 is riveted together at the same time with the auxiliary arm 24 and the planetary gear element 28 in that the bolt ends projecting over the auxiliary arm, respectively, the planetary gear element are flattened off by riveting and are exapanded outwardly for abutment at the respective outside of the auxiliary arm and planetary gear element.

The alternative bearing bolt generally designated by reference numeral 178 and illustrated in FIGS. 5 and 6 for the pivot bearing 20 differs from the bearing bolt 78 only in that one of the two end sections (the lower end section 182' in FIG. 5) is not constructed noncircular but is provided with a bolt head 186 of increased diameter. The upper end section 82 therefore remains unchanged. The lower part in FIG. 2 of the two parts to be connected with each other consisting of auxiliary arm and planetary gear element (in this case the planetary gear element 28) is mounted with a circular opening 190 on the correspondingly extended center section 180 and is welded together with the head 186 along the radial annular surface 194 formed between the center section 180 and the head 186 of increased diameter by means of three welding humps 192. After the bolt 178 is inserted into the main arm 18 and into the auxiliary arm 24, the bolt 178 can again be riveted together with the auxiliary arm 24 by pressing flat the upper bolt end.

During an actuation of the arm window lifter 10 described hereinabove, the auxiliary arm 24 would also carry out accurately a full rotation with a full rotation of the main arm 18 because the effective radius r of the planetary gear element 28 is correspondingly determined. By reason of the same distance of the two points of engagement 30 and 38 at the second axis 22, the line 40 does not change its orientation in relation to the plane of the drawing of FIG. 1 during the window lifter actuation, i.e., it is displaced in parallel.

The high efficiency of the mechanism described hereinabove should be emphasized because the friction losses of the mutually meshing teeth 29 and 34 having relatively large tooth rim-diameters are comparatively low. The relatively high mechanical loadability of the arrangement which can thus be obtained permits by corresponding lengthening of the main arm and auxiliary arm to utilize a larger support base for the support disk which is of significance for a reliable guidance of the windowpane. The space requirement is thereby small. Few parts are necessary which assures improved ease of assembly and lower overall weight.

By a corresponding change of the geometric determining magnitudes indicated hereinabove, also a movement of the window with a tilting to the A column or to the B column with successive tilting to the A column and to the B column can be achieved in lieu of a parallel movement. This can be of significance, for example, with convertibles having only unilaterally guided windows. This tilting arrangement is shown by tilting line **40*a* for the window wherein point of engagement 30*a* is moved inwardly of the end of main arm 18**.

In lieu of a toothed planetary gear element 28, a planetary gear element provided with a corresponding friction surface **28*a* (see FIG. 9) of planetary gear element 28*a* may also possibly be used which rolls off in frictional engagement along a friction surface 34*a* of an arcuate portion 36*a*** fixed at the base plate and corresponding to the toothed arc. The relatively large radius of the planetary gear element makes this type of force transmission possible without limiting the function.

Figure 7:
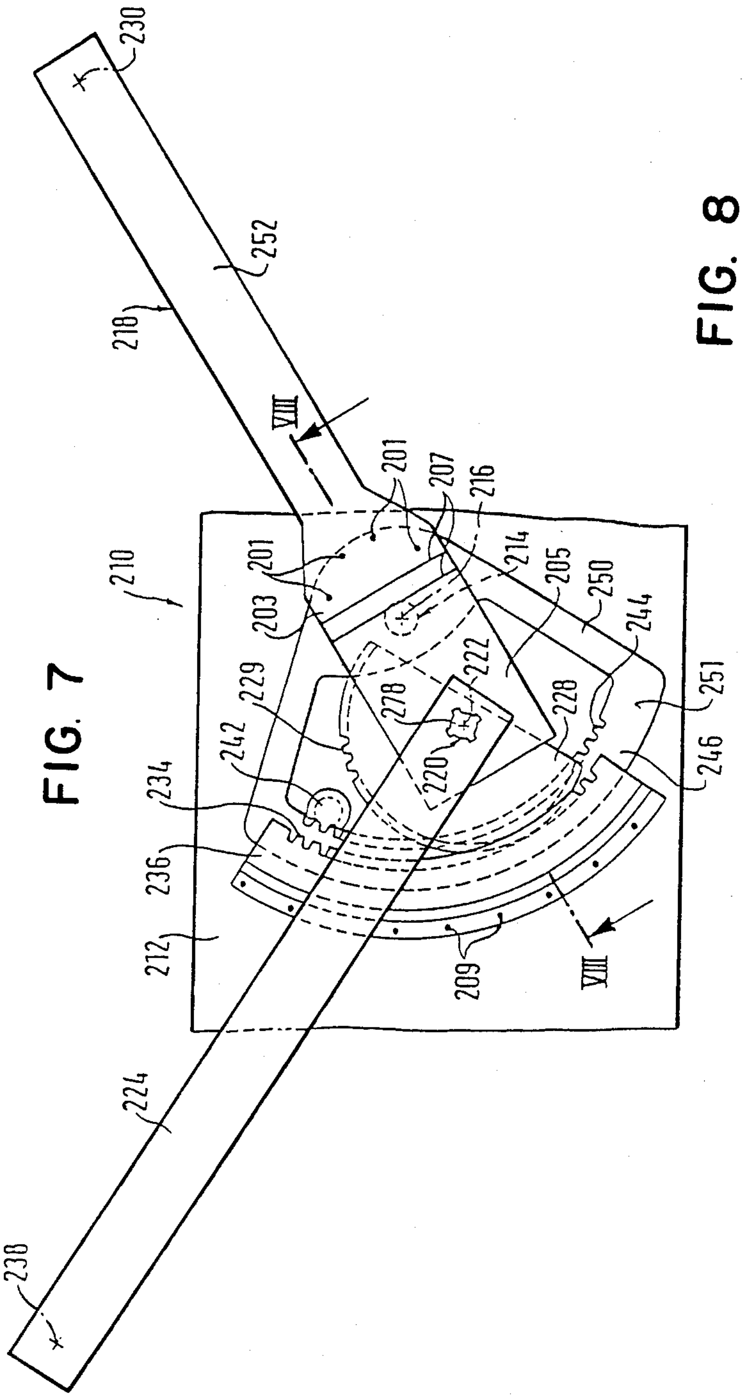
FIG. 7 is a simplified side elevational view of still another modified embodiment of an arm-window lifter in accordance with the present invention.
Figure 8:
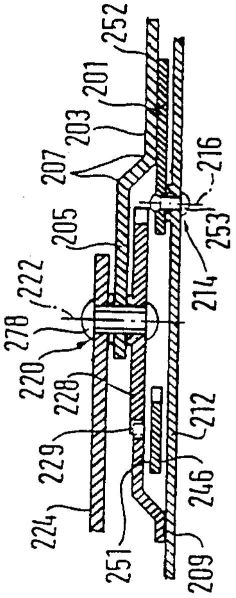
FIG. 8 is a partial cross-sectional view taken along line VIII—VIII of FIG. 7.

The further embodiment illustrated in FIGS. 7 and 8 of an arm-window lifter is generally designated by reference numeral 210. Correspondingly, components of this embodiment are designated by the same reference numerals of corresponding parts in FIGS. 1 and 2, each increased by the number 200.

The base plate designated therefor by reference numeral 212, which is shown broken away, is rigidly connected with the main arm 218 by way of the first pivot bearing 214 having the axis of rotation 216; a corresponding pivot bearing bolt 253 is indicated in FIG. 8. The main arm 218 is constructed two-partite and consists of the toothed-segmental arc portion and of the arm portion 252.

The toothed-segmental arc portion has approximately the shape of an arcuate triangle whereby the triangle arc is formed by the toothed-segmental arc 246, into the internal teeth 244 of which engages the driving pinion 242. The driving pinion 242 does not project above the upper side 251 opposite the base plate 212 of the toothed-segmental arc 246.

The arm portion 252 is formed by an elongated strip which is connected with the toothed-segmental arc portion 250 at a distance from its two ends, especially is spot-welded thereto (corresponding welding points 201 are indicated in FIGS. 7 and 8). This fastening place designated by reference numeral 203 of the arm portion 252 at the toothed-segmental arc portion 250 is located on the side of the pivot bearing 214 opposite the toothed-segmental arc 246. The arm section 205 of the arm portion 252 which in FIGS. 7 and 8 adjoins the fastening place 203 toward the left, i.e., toward the toothed-segmental arc 246 is bent twice approximately z-shaped directly adjoining the fastening place 203 (bending edges 207) in order to obtain an extension of the arm section 205 parallel and at a distance to the top side 251 of the toothed-segmental arc portion 250. The planetary gear element 228 which is nonrotatably connected with the auxiliary arm 224 by way of the bearing bolt 278 of the second pivot bearing 220 (having an axis of rotation 222) can be arranged in this manner within the area between the toothed-segmental arc portion 250 and the arm section 205. The second pivot bearing 220 is located on the side of the first pivot bearing 214 opposite the point of force engagement 230 of the main arm 218 within the area of the free end of the arm section 205. The double bending (bending edges 207) of the arm section 205 thereby also permits that the planetary gear element 228 can traverse the area of the pivot axis 216 of the first pivot bearing 214. Consequently also in this case the condition essential for the parallel displacement of the window can be fulfilled, namely, the equality of the distance between the pivot axes 216 and 222 with the effective radius of the teeth of the planetary gear element 228. The other condition is the equality of the effective length of the main arm 218 and of the auxiliary arm 224 (equal distance of the point of force engagement 230—pivot axis 216 and point of force engagement 238—pivot axis 222).

The external teeth 229 of the planetary gear element 228 engage in the internal teeth 234 of the toothed arc 236. As these internal teeth 234 are necessarily constructed concentric in relation to the pivot axis 216, their effective radius amounts to twice the radius of the teeth of the planetary gear element 228. The toothed arc 236 is bent twice similar to the arm section 205 and extends in this manner over the toothed-segmental arc 246 as can be seen from FIG. 8. The toothed arc 236 is rigidly connected with the base plate 212, be it by spot welding (welding points 209) or the like or corresponding to FIG. 1 by way of an elongated aperture-bolt-screw connection with the possibility of an angular adjustment. The internal teeth 234 of the toothed arc 236 are therefore located above the top side 251 of the toothed-segmental arc 246 within the same plane as the planetary gear element 228 so that the mutual engagement is possible without difficulty. The roll-off movement of the external teeth 229 of the planetary gear element 228 along the internal teeth 234 is also not prevented by the pinion 242 because, as already mentioned, the pinion 242 does not project beyond the top side 251 of the toothed-segmental arc 246. The toothed arc 236 thereby also serves as hold-down member for the toothed-segmental arc 246 because the latter is prevented by the toothed arc 236 from moving out of engagement with the pinion 242 in a direction away from the base plate 212.

The arm-window lifter described hereinabove by reference to FIGS. 7 and 8 is characterized by a particular compactness because the toothed arc 236 can be arranged within the area of the pinion 242 so that a possibly necessary extension of the base plate for the mounting of the toothed arc becomes unnecessary. The manufacture is particularly simple together with mechanically robust construction.

In all of the embodiments described hereinabove, one obtains a parallel movement or displacement of the window, i.e., a parallel displacement of the window with the window lifter actuation under the prerequisite that the effective lever length of the main arm 18 (i.e., the distance between the axis 22 of the second pivot bearing 20 and the point of force engagement 30 at the window 32) is equal to the effective lever length of the auxiliary arm (i.e., distance between the axis 22 of the second pivot bearing 20 and the point of force engagement 38 at the window 32). Furthermore, the diameter of the planetary gear element 28 must be equal to the radius of the toothed arc 36. In order that the planetary gear element 28 engages properly in the toothed arc 37 during the pivot movement of the main arm 18, the geometric center point of the arc which is followed by the toothed arc 36 must, of course, coincide with the axis of rotation 16 of the main arm 18 on the base plate 12. The planetary gear 28 therefore pivots at least temporarily through the area of the axis 16 of the first pivot bearing. This becomes possible according to the present invention in that the toothed-segmental arc portion 50, 150, 250 is offset with respect to the arm portion 52, 152, 252 in a direction away from the base plate 12, 212; the spacing between the toothed-segmental arc portion and the arm portion forms a movement space (engagement slot) for the planetary gear element within the area of the first pivot bearing.

In order to attain also a more or less pronounced pivot movement of the window, in addition to the displacement movement of the window, especially for rear windows of convertible passenger motor vehicles, it is only necessary to deviate from the conditions indicated hereinabove for the parallel movement. For that purpose, it is only necessary to change, for example, the effective lever length of the main arm or of the auxiliary arm.

The embodiment according to FIGS. 7 and 8 distinguishes itself by special compactness because the toothed arc 236 is arranged within the area of the driving pinion 242 for the toothed-segmental arc portion 250. The base plate 212 can therefore be constructed correspondingly shortened on the side of the first pivot bearing 220 opposite the driving pinion 242.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An arm-window lifter, comprising main arm means operable to engage at a window and supported at a support means by way of a first pivot bearing means, drive means for said main arm means, a positively controlled auxiliary arm means operable to engage at the window and rotatably supported on said main arm means, a planetary gear element rotatably supported at the main arm means in a second pivot bearing means having an axial distance to the first pivot bearing means, and teeth fixedly arranged at the support means, the planetary gear element connected to the auxiliary arm means and engaging the teeth at the support means.

2. An arm-window lifter according to claim 1, wherein the auxiliary arm means is nonrotatably connected with the planetary gear element and the teeth at the support means are formed by internal teeth of a toothed arc.

3. An arm-window lifter according to claim 2, wherein said planetary gear element is sector-shaped.

4. An arm-window lifter according to claim 2, wherein the distance between the axis of the second pivot bearing means and the point of force engagement of the main arm means at the window is essentially equal to the distance between the axis of the second pivot bearing means and the point of force engagement of the auxiliary arm means at the window, and wherein the distance between the axes of the two pivot bearing means corresponds essentially to the effective radius of the planetary gear element.

5. An arm-window lifter according to claim 4, wherein at least one of the distances is changed for achieving a pivot movement of the window.

6. An arm-window lifter according to claim 2, wherein the main arm means is formed by a toothed-segmental arc portion carrying the first pivot bearing means and having a toothed-segmental arc and by an arm portion fixedly attached at the toothed-segmental arc portion on the side opposite the toothed-segmental arc.

7. An arm-window lifter according to claim 6, wherein the main arm means is provided with a slot for the planetary gear element within the area of the first pivot bearing means.

8. An arm-window lifter according to claim 7, wherein for purposes of forming the slot, the toothed-segmental arc portion, which is of substantially plate shape, cooperates with the slot arranged within the area between the two pivot bearing means and which slot partly surrounds the first pivot bearing means, and wherein the section of the toothed-segmental arc portion forming a mounting section and carrying the second pivot bearing means is held within the area between ends of the slot, substantially parallel and at an interior distance to the plate plane of the remaining section of the toothed-segmental arc portion carrying the toothed-segmental arc by means of bends.

9. An arm-window lifter according to claim 8, wherein the arm portion is rigidly secured on the mounting section on the side of the second pivot bearing means opposite the first pivot bearing means.

10. An arm-window lifter according to claim 6, wherein the arm portion is rigidly secured with a fork-shaped end at the toothed-segmental arc portion, the fork ends surrounding the first pivot bearing means and being correspondingly bent for forming an internal distance between the plane of the essentially plate-shaped toothed-segmental arc portion and the movement plane of the arm portion.

11. An arm-window lifter according to claim 6, wherein the arm portion is provided with at least two bearing places for the second pivot bearing means.

12. An arm-window lifter according to claim 1, wherein the second pivot bearing means includes a bearing bolt which extends through a bearing bore of the main arm means and whose one end is nonrotatably connected with the auxiliary arm means and whose other end is non-rotatably connected with the planetary gear element.

13. An arm-window lifter according to claim 12, wherein the bearing bolt has a cylindrical center section matched to the bearing bore and at least one noncircular end section on which is mounted the respective part having a complementary opening and is rigidly riveted together with the end section.

14. An arm-window lifter according to claim 13, wherein the bearing bolt includes an end section enlarged in diameter in comparison to the center section which is welded together with one of planetary gear element and auxiliary arm means by means of welding humps along the radial annular surface formed between the end section and the center section.

15. An arm-window lifter according to claim 2, wherein at least one of said toothed arc and planetary gear element is provided on its side opposite the support means, respectively, facing the support means with a guide web abutting laterally at the teeth row of the respectively other part.

16. An arm-window lifter according to claim 15, wherein the guide web provided at the toothed arc is constructed as a separate part of metal or plastic material.

17. An arm-window lifter according to claim 15, wherein the toothed arc is constructed in one piece with the guide web and is made from at least one of an aluminum die casting, a zinc pressure die-casting and a plastic part.

18. An arm-window lifter according to claim 2, wherein at least three to sixteen teeth of the planetary gear element engage into the teeth of the toothed arc.

19. An arm-window lifter according to claim 18, wherein six teeth of the planetary gear element engage into the teeth of the toothed arc.

20. An arm-window lifter according to claim 2, wherein the toothed arc is secured at the support means adjustable in the toothed arc direction.

21. An arm-window lifter according to claim 1, wherein at least one of the two pivot bearing means is constructed as plastic bearing.

22. An arm-window lifter according to claim 1, wherein the planetary gear element is constructed as friction gear which rolls off in frictional engagement along a friction surface fixed at the support means.

23. An arm-window lifter according to claim 2, wherein the second pivot bearing means is arranged on the main arm means on the side of the first pivot bearing means opposite the point of force engagement of the main arm means at the window.

24. An arm-window lifter according to claim 23, wherein the teeth fixed at the support means are provided as toothed arc having internal teeth within the area of a toothed segment arc of the main arm means.

25. An arm-window lifter according to claim 24, wherein the toothed arc at least partially surrounds the front end of the toothed-segmental arc opposite the support means.

26. An arm-window lifter according to claim 6, wherein the arm portion has an arm section carrying the second pivot bearing means which extends from the fastening place of the arm portion at the toothed-segmental arc portion to the end of the arm portion opposite from the point of force engagement of the main arm means at the window, and wherein the planetary gear element is arranged between the arm section and the toothed-segmental arc portion.

27. An arm-window lifter according to claim 26, wherein the arm section has double bends within the area of the fastening place.

28. An arm-window lifter, comprising main arm means operable to engage at a window which is pivotally supported by way of a first pivot bearing means at a support means, drive means for the main arm means, a positively controlled auxiliary arm means rotatably supported on the main arm means on the side of the main arm means opposite the support means and operable to engage the window, a planetary gear element rotatably supported in a second pivot bearing means on the side of the main arm means facing the support means and at an axial distance to the first pivot bearing means, the planetary gear element connected to the auxiliary arm means as well as engaging in teeth fixedly arranged at the support means, the main arm means being formed by a toothed-segmental arc portion carrying the first pivot bearing means and provided with a toothed-segmental arc and by an arm portion carrying the second pivot bearing means and fixedly attached at the toothed-segmental arc portion, the auxiliary arm means being nonrotatably connected with the planetary gear element, the teeth at the support means being formed by internal teeth of a toothed arc, and the arm portion being displaced in a direction away from the support means with respect to the toothed-segmental arc portion under formation of an engaging slot within the area of the first pivot bearing means to enable a pivot movement of the planetary gear element arranged between the arm portion and the toothed-segmental arc portion through the area of the first pivot bearing means.

29. An arm-window lifter according to claim 28, wherein the distance between the axis of the second pivot bearing means and the point of force engagement of the main arm means at the window is essentially equal to the distance between the axis of the second pivot bearing means and the point of force engagement of the auxiliary arm means at the window, and wherein the distance between the axes of the two pivot bearing means corresponds essentially to the effective radius of the planetary gear element.

30. An arm-window lifter according to claim 29, wherein for achieving a pivot movement of the window, at least one of the distances is changed.

* * * * *